(12) United States Patent
Osawey

(10) Patent No.: US 11,903,389 B2
(45) Date of Patent: Feb. 20, 2024

(54) SNAKE REPELLANT COMPOUND

(71) Applicant: Felix Osawey, Garland, TX (US)

(72) Inventor: Felix Osawey, Garland, TX (US)

(*) Notice: Subject to any disclaimer, the term of this patent is extended or adjusted under 35 U.S.C. 154(b) by 40 days.

(21) Appl. No.: 17/677,405

(22) Filed: Feb. 22, 2022

(65) Prior Publication Data

US 2023/0263171 A1 Aug. 24, 2023

(51) Int. Cl.
*A01N 65/08* (2009.01)
*A01N 25/26* (2006.01)
*A01N 65/44* (2009.01)
*A01P 17/00* (2006.01)

(52) U.S. Cl.
CPC ............ *A01N 65/08* (2013.01); *A01N 25/26* (2013.01); *A01N 65/44* (2013.01); *A01P 17/00* (2021.08)

(58) Field of Classification Search
None
See application file for complete search history.

(56) References Cited

U.S. PATENT DOCUMENTS

2022/0046876 A1* 2/2022 Sirizzotti ............... A01H 1/126

* cited by examiner

*Primary Examiner* — Alton N Pryor
(74) *Attorney, Agent, or Firm* — The Iwashko Law Firm, PLLC; Lev Ivan Gabriel Iwashko

(57) ABSTRACT

A snake repellant compound, including a main body, a first plant disposed on and within at least a portion of the main body, a second plant disposed on and within at least a portion of the main body, and at least one seed disposed on and within at least a portion of the main body, such that collectively, the first plant, the second plant, and the at least one seed repel a snake therefrom.

1 Claim, 1 Drawing Sheet

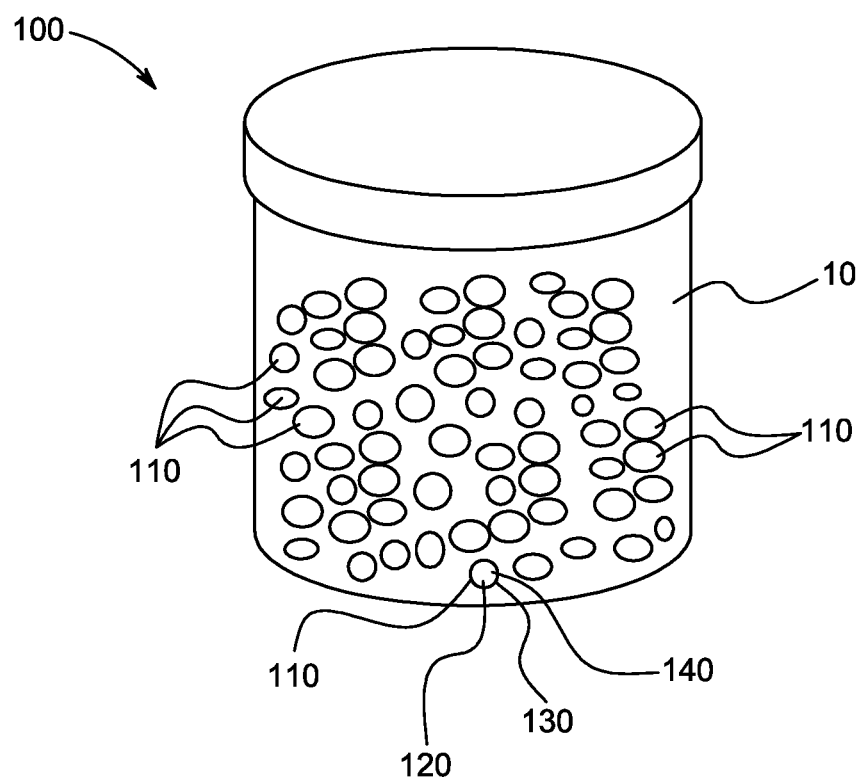

SNAKE REPELLANT COMPOUND

BACKGROUND

1. Field

The present general inventive concept relates generally to a snake repellant, and particularly, to a snake repellant compound.

2. Description of the Related Art

Many people have a fear of snakes. Although most snakes are not venomous, some will nevertheless bite as a form of self-defense. Regardless, the sight of a snake in and/or around a house can be traumatic and a potentially health-threatening situation. Unfortunately, many products advertised to repel snakes are ineffective and/or do not sufficiently deter the snakes from approaching the house.

Moreover, most scent-based snake repellants are made from ingredients that are harmful to people and/or pets, should they come into direct contact with them. Additionally, some snake repellants have a potent aroma, making it unpleasant to live and/or remain around the area where the snake repellant has been used.

Therefore, there is a need for a snake repellant compound that is long lasting, does not harm people and/or pets, and does not emit an offensive odor for people and/or pets.

SUMMARY

The present general inventive concept provides a snake repellant compound.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a snake repellant compound, including a main body, a first plant disposed on and within at least a portion of the main body, a second plant disposed on and within at least a portion of the main body, and at least one seed disposed on and within at least a portion of the main body, such that collectively, the first plant, the second plant, and the at least one seed repel a snake therefrom.

The main body may be constructed of a biodegradable shell.

The first plant may be *Telfairia occidentalis*, the second plant is Garcinia kola, and the at least one seed is yellow corn.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a side view of a snake repellant compound as disposed within a container, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Snake Repellant Compound 100
Main Body 110
First Plant 120
Second Plant 130
Seed 140

FIG. 1 illustrates a side view of a snake repellant compound 100 as disposed within a container 10, according to an exemplary embodiment of the present general inventive concept.

The snake repellant compound 100 may include a main body 110, a first plant 120, a second plant 130, and at least one seed 140, but is not limited thereto.

The main body 110 may include a biodegradable shell, but is not limited thereto. For example, the main body 110 may be constructed of a recycled paper and/or a mesh.

Referring to FIG. 1, the main body 110 is illustrated to have a spherical shape. However, the main body 110 may be rectangular, circular, cylindrical, triangular, pentagonal, hexagonal, heptagonal, octagonal, or any other shape known to one of ordinary skill in the art, but is not limited thereto.

Also, referring again to FIG. 1, the main body 110 is illustrated to be a granule. However, the main body 110 may be a powder, a liquid solution, a grain, or any other type of compound known to one of ordinary skill in the art, but is not limited thereto.

The first plant 120 may include *Telfairia occidentalis* (La, fluted gourd), but is not limited thereto.

The first plant 120 may be disposed on and/or within at least a portion of the main body 110. However, the first plant 120 may be a plurality of first plants 120.

The second plant 130 may include Garcinia kola (i.e., bitter kola), but is not limited thereto.

The second plant 130 may be disposed on and/or within at least a portion of the main body 110. However, the second plant 130 may be a plurality of second plants 130.

The at least one seed 140 may include maize and yellow corn, but is not limited thereto.

The at least one seed 140 may be disposed on and/or within at least a portion of the main body 110.

The main body 110 may be shaped as a result of a combination of the first plant 120, the second plant 130, and/or the at least one seed 140. Alternatively, the main body 110 may be store the first plant 120, the second plant 130, and/or the at least one seed 140 within the recycled paper and/or the mesh.

Collectively, the first plant 120, the second plant 130, and/or the at least one seed 140 may repel an animal, such as a snake therefrom. However, the first plant 120, the second plant 130, and/or the at least one seed 140 may be non-harmful to humans and/or pets (e.g., dogs, cats) due to being only natural ingredients. In other words, the first plant 120, the second plant 130, and/or the at least one seed 140 may not cause injury and/or sickness to humans and/or pets in response to ingestion, touch, and/or smell.

Moreover, the first plant 120, the second plant 130, and/or the at least one seed 140 may endure within an environment for a predetermined period of time. For example, the first plant 120, the second plant 130, and/or the at least one seed 140 may remain in the environment between six months to twelve months.

Furthermore, the first plant 120 and/or the second plant 130 may use additional ingredients, such as cedar oil, clove oil, and/or rosemary oil.

Therefore, the snake repellant compound 100 may repel a snake while being safe for the environment. Also, the snake repellant compound 100 may not have a strong odor that affects people and/or pets.

The present general inventive concept may include a snake repellant compound 100, including a main body 100, a first plant 120 disposed on and within at least a portion of the main body 110, a second plant 130 disposed on and within at least a portion of the main body 110, and at least one seed 140 disposed on and within at least a portion of the main body 110, such that collectively, the first plant 120, the second plant 130, and the at least one seed 140 repel a snake therefrom.

The main body may be constructed of a biodegradable shell.

The first plant may be *Telfairia occidentalis*, the second plant is Garcinia kola, and the at least one seed is yellow corn.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A snake repellant composition comprising *Telfairia occidentalis* and Garcinia kola and yellow corn seed being effective at repelling a snake therefrom; wherein the snake repellant composition is in the form of a powder or granule, and wherein the snake repellant composition is nonharmful to pets and humans.

* * * * *